Nov. 26, 1935.    J. E. KIRK    2,022,354
SEEDING ATTACHMENT FOR DISK HARROWS
Filed March 26, 1935    2 Sheets-Sheet 1
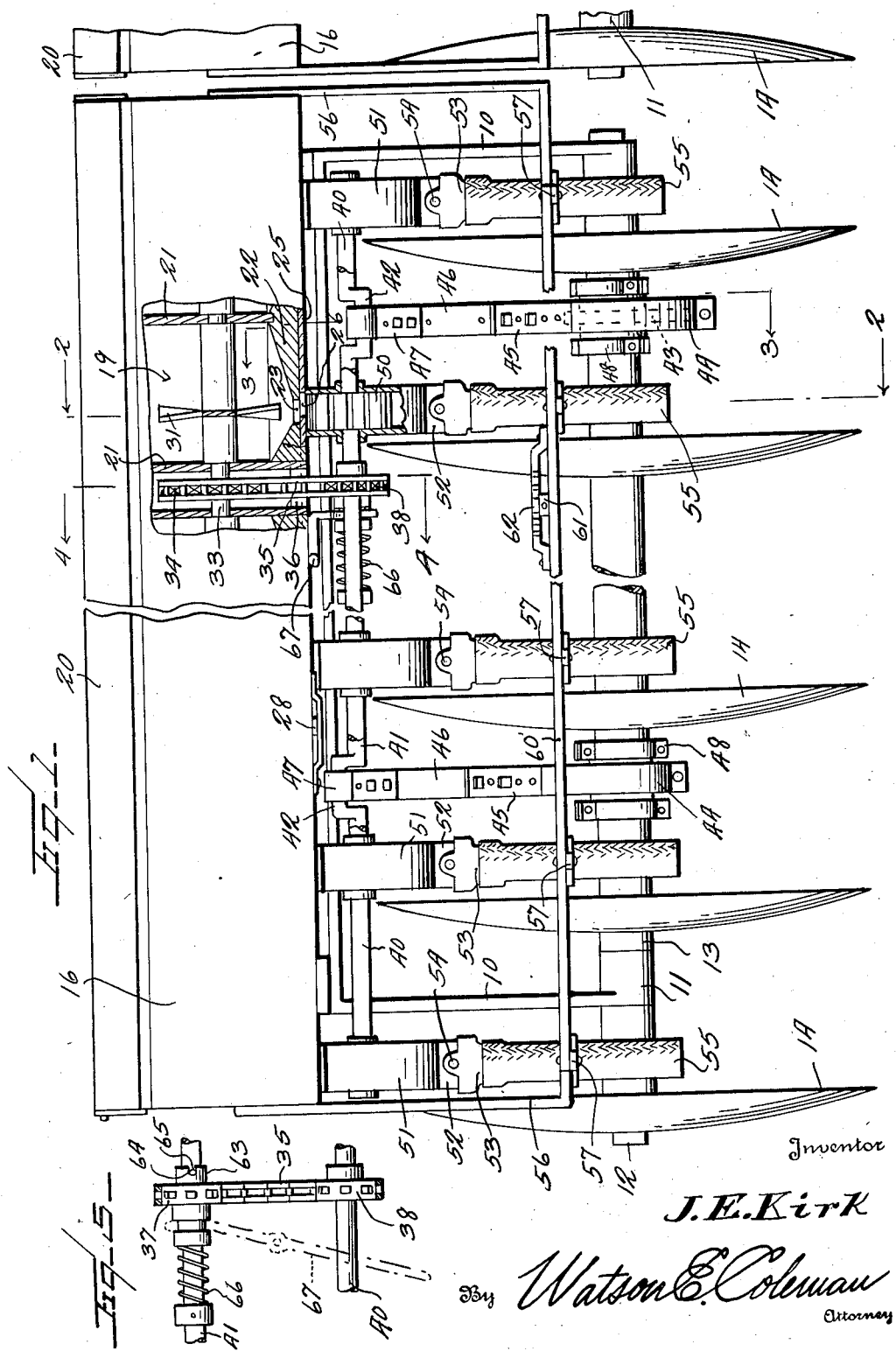
Inventor
J. E. Kirk
By Watson E. Coleman
Attorney Nov. 26, 1935.　　　　J. E. KIRK　　　　2,022,354
SEEDING ATTACHMENT FOR DISK HARROWS
Filed March 26, 1935　　2 Sheets-Sheet 2
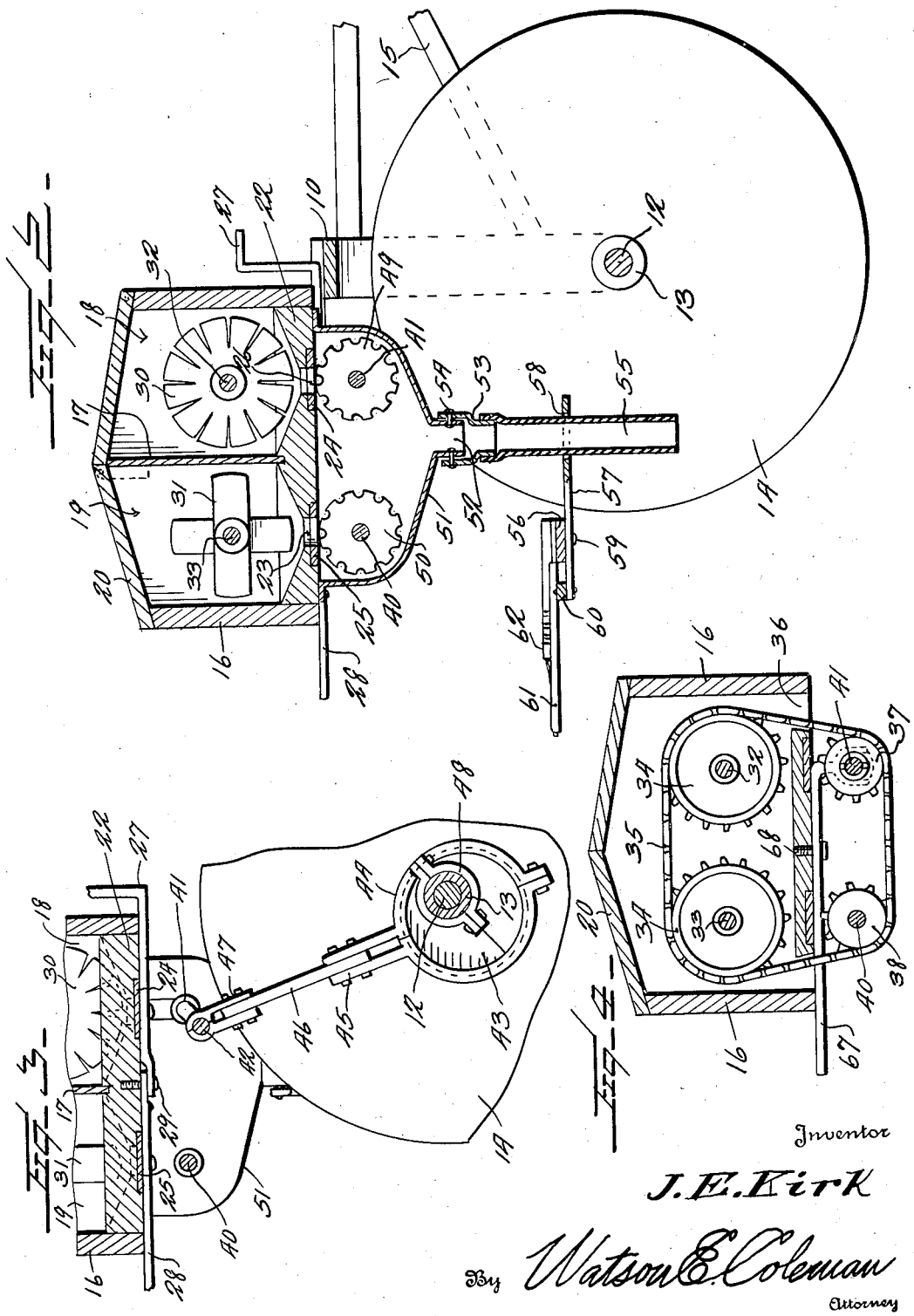
Inventor
J. E. Kirk
By Watson E. Coleman
Attorney Patented Nov. 26, 1935

2,022,354

UNITED STATES PATENT OFFICE 2,022,354

SEEDING ATTACHMENT FOR DISK HARROWS

James E. Kirk, Haralson County, Ga., assignor of one-third to Laborn P. McMillian, Rockmart, Ga.

Application March 26, 1935, Serial No. 13,151

3 Claims. (Cl. 111—1)

This invention relates to a seed drill or like machine, and particularly to an attachment adapted to be placed on a disk harrow so that the seeding may occur at the same time that the ground is being harrowed.

An object of this invention is to provide a structure of the character stated which will deliver seed and fertilizer from separate compartments into discharge pipes in uniform quantities, and which is so constructed that the feed will stop when the machine stops.

A further object is to provide means to stop the feeding of fertilizer and seed when it is not desired.

A still further object is to provide means whereby the feed discharge pipe leading from each seed and fertilizer compartment may be adjustably shifted to discharge the seed and fertilizer nearer to or further from the convex side of each harrow disk whereby to control the amount of earth which will fall upon and cover in the seed.

Other objects will appear in the course of the following description.

My invention is illustrated in the accompanying drawings, wherein

Figure 1 is a rear elevation of a combined spreader and harrow constructed in accordance with my invention.

Fig. 2 is a section on the line 2—2 of Fig. 1.

Fig. 3 is a fragmentary section on the line 3—3 of Fig. 1.

Fig. 4 is a section on the line 4—4 of Fig. 1, and

Fig. 5 is an elevation of the clutch used.

Referring to these drawings, 10 designates generally the U-shaped frame of an ordinary harrow, 11 designating the bearing at the lower end of the frame for supporting the shaft 12. Upon this shaft 12 are mounted the tubular sections which constitute the disc carrying shaft of the harrow and these sections carry the disks 14. These harrow disks are concavo-convex, as usual. Extending forward from the frame are any suitable draft means, designated generally 15, whereby the harrow may be drawn over the ground, as for instance by means of a tractor. So far I have described an ordinary disc harrow, but my invention consists in applying to this disk harrow seeding mechanism as follows:

Supported upon the frame 10 in any suitable manner is a casing, designated generally 16, which has a length equal to that of the harrow and which is divided into two compartments by an intermediate partition 17. The compartment 18 is designed for the reception of grain or other seed, and the compartment 19 is designed for the reception of fertilizer. These compartments have hinged covers 20. The compartments 18 and 19 are not continuous, but for reasons which will be stated, each of these compartments is divided by partitions 21 into a number of minor compartments. This is for the purpose of preventing seed or fertilizer from sliding down towards one end of the casing or toward the other end of the casing when the machine is traveling over rough ground or on a hillside. By dividing the main compartments 18 and 19 into a plurality of minor compartments, the seed or fertilizer can slide but a very short distance. The bottom of the casing is designated 22, and this bottom, beneath each of the minor compartments, is formed with a hopper-shaped depression and a discharge opening 23. Inset into the bottom 22 and longitudinally movable therealong are the two plates 24 and 25, the plate 24 being for the purpose of controlling the feed of seed or grain, while the plate 25 is for the purpose of controlling the feed of fertilizer. Each of these plates is provided with a series of openings 26, and by sliding these plates in one direction or the other the openings in the plates are brought into more or less registry with the openings 23 and thus the feed regulated.

For the purpose of sliding these plates 24 and 25, I provide the levers 27 and 28 which, as shown in Fig. 3, are pivoted upon the pivot pin 29, extending up into the bottom 22. These levers project out in different directions and are provided with handles whereby the levers may be operated, and thus it will be seen that the feed of seed and fertilizer may be separately regulated.

For the purpose of agitating the seed and fertilizer I provide agitators 30 and 31, respectively, disposed in the seed and fertilizer compartments, these agitators being mounted upon shafts 32 and 33, as illustrated in Figs. 1 and 4. Each of these shafts carries upon it the sprocket wheel 34 and a sprocket chain 35 is drawn over these shafts and passes downward through openings 36 and over sprocket wheels 37 and 38 mounted on shafts 40 and 41 which extend longitudinally beneath the casing 16.

For the purpose of driving the sprocket chain, one of these shafts, as, for instance the shaft 41, is driven from the harrow supporting shaft, and to this end this shaft 41 is provided with cranks 42. Mounted upon the harrow shaft constituted by the sections 13 are two eccentrics 43 having the eccentric rings 44 shown as formed in two sections and provided with outwardly extending lugs 45. Adjustably disposed between these lugs is a connecting rod 46, which is connected to the corresponding crank 42 by means of a forked clip 47.

The connecting rod 46 is adjustable between the lugs 45 so that this attachment may be applied to harrows of different sizes or which differ from each other in dimensions. As shown in Fig. 3 the eccentric 43 is also preferably made in two sections having semicircular clamping members 48 formed therewith which embrace the sleeves or tubular sections 13 upon which the harrow disks are mounted. The ring 44 is, of course, made in two sections. Thus it is an easy matter to apply these eccentrics to the wheel carrying shaft of any disk harrow.

Disposed upon the shafts 40 and 41 beneath each of the minor compartments, are the disks or wheels 49 and 50. The periphery of each disk 49 or 50 is formed with a series of transversely extending recesses or notches as shown clearly in Figs. 1 and 2, and the peripheries of these wheels closely approximate the under faces of the sliding plates 24 and 25, so that seed or fertilizer passing down through the openings in these plates will be caught in these recesses and discharged steadily at a definite speed. Each pair of wheels or disks 49 and 50 is carried within a housing 51. The side walls of the housing closely approximates the wheels 49 and 50, as shown in Fig. 1. The housing is hopper-shaped and discharges through an opening in its bottom, designated 52. Attached to the downwardly discharging portion 52 is a nipple or like member 53 which is pivoted to the nipple 52 by means of the pin 54, and connected to this nipple 53 is a discharge pipe 55. It will thus be seen that the discharge pipes 55, which may be of metal or may be of canvas, can be shifted upon the pivots 54 toward or from the respective harrow disks 14.

For the purpose of shifting these discharge pipes 55 I provide a depending yoke 56 mounted upon the casing 16, and pivotally mounted upon this yoke are the levers 57, each of these levers being provided with an opening 58 through which the corresponding discharge pipe 55 passes. The levers are pivoted to the yoke at 59 and the rear ends of the levers are connected by a connecting rod 60.

Also pivoted upon the yoke 56 is an operating lever 61 which is pivotally connected to the connecting rod 60, this lever operating over a sector 62, the lever having means engaging the sector whereby the operating lever 61 may be held in adjusted position. The purpose of swinging the discharge spouts 55 in one direction or the other, is to discharge the seed and fertilizer closer to the convex faces of the harrow disks or farther away from said faces. If the seed is discharged close to the convex face of a harrow disk the deeper the seed will be covered, and as the discharge spouts are shifted away from the convex faces of the harrow disks less dirt will fall upon the seed. Thus by shifting these discharge spouts 55 in one direction or the other seed may be caused to be covered to a greater or less depth as desired. It will be noted that the shaft 32 is driven in the manner heretofore described from the harrow shaft, that is, from the sections 13 which carry the harrows and which rotate as they are driven over the ground, and for the purpose of stopping the feed of fertilizer and seed whenever desired, I provide a clutch mechanism, shown in Fig. 5. In this figure, the sprocket wheel 37 is shown as being loosely mounted upon the shaft 41, being carried upon a collar 63 which is slidable upon the shaft 41 and is provided at one end with a notch 64 engageable with the pin 65 carried upon the shaft 41. A spring 66 urges this collar into engagement with the pin 65 and when it is desired to permit the shaft 41 to rotate without operating the feed wheels 49 and 50 or the agitators 30 and 31, the collar 63 is retracted against action of the spring by means of a lever 67 pivoted on a pin 68, as shown in Fig. 4, this lever being provided with any suitable detaining device whereby the collar 63 may be held out of engagement with the pin 65.

By this means the machine may be drawn over the ground without planting but if the lever 67 is thrown or released so as to permit the engagement of the collar 63 with the pin 65, then the seeding mechanism is rendered operative.

It will be seen that I have provided an attachment which may be readily applied to ordinary disk harrows so that seeding may be accomplished at the same time as harrowing is done, and it will be noted particularly that I have provided means whereby the seed may be covered to a greater or less depth as desired.

While I have illustrated certain details of construction and arrangement of parts, I do not wish to be limited thereto as it is obvious that many minor changes might be made without departing from the spirit of the invention as defined in the appended claims.

It is to be understood that Figure 1 shows the left section of a harrow with a seed box extending out over the right side of the left section of the harrow in order to have one seed hose between the two sections of the harrow. The right hand seed box would have one less seed hose in order to make the seed box come just even with the outside section of the harrow. It will also be understood that in Figure 1, the seed box and harrow shaft are broken away in order to accommodate the figure to the length of the sheet and that one of the harrows and its accompanying seed spout has been omitted.

What is claimed, is:

1. The combination with a harrow having a frame, and harrow disks supported thereby, of a casing carried by the frame and divided to form two series of fertilizer and seed compartments, the bottom of each compartment having regulatable discharge openings, a shaft extending beneath the openings in each series and carrying a series of notched disks disposed beneath and closely adjacent to each compartment opening, a hopper-shaped housing for each pair of fertilizer and seed discharge openings, a spout extending downward from each housing and mounted for lateral swinging movement, means for driving said shafts from the harrow disk shaft, and means for swinging the discharge spouts nearer to or farther from the harrow disks.

2. The combination with a harrow comprising a frame, harrow disks supported thereon and a shaft upon which the disks are mounted, of a casing carried by the frame above the harrow disks and divided to provide a series of front and rear compartments, one series of compartments being for fertilizer and the other series for seed, the bottom of each compartment having a discharge opening, means for regulating the discharge of material through said openings, a pair of shafts extending longitudinally of and beneath the casing, each shaft having thereon a series of notched disks disposed immediately beneath and closely adjacent to the openings in the several compartments, a hopper for each pair of fertilizer and seed discharging disks, a spout extending downward from each hopper and pivotally mounted for lateral swinging movement, means for driving said shafts from the harrow supporting shaft, and manually operable means for swinging the discharge spouts nearer to or farther from the convex faces of the harrow disks.

3. The combination with a harrow comprising a frame, harrow disks supported thereon and a shaft upon which the disks are mounted, of a casing carried by the frame above the harrow disks and divided to provide a series of front and rear compartments, one series of compartments being for fertilizer and the other series for seed, the bottom of each compartment having a discharge opening, means for regulating the discharge of material through said openings, a pair of shafts extending longitudinally of and beneath the casing, each shaft having thereon a series of notched disks disposed immediately beneath and closely adjacent to the openings in the several compartments, a hopper for each pair of fertilizer and seed discharging disks, a spout extending downward from each hopper and pivotally mounted on the hopper for lateral swinging movement, means for driving said second named shafts from the harrow supporting shaft, including eccentrics mounted on the harrow supporting shaft, eccentric rings associated with the eccentrics, connecting rods extending from the eccentric rings, cranks carried by one of said second named shafts and with which the connecting rods engage, means for driving the other shaft of the pair from said crank shaft and clutch means for operatively connecting the crank shaft with or disconnecting it from the harrow shaft.

JAMES E. KIRK.